United States Patent [19]

Buzzi

[11] 4,236,624
[45] Dec. 2, 1980

[54] APPARATUS FOR ORIENTATING ELONGATED ARTICLES, SUCH AS BODIES OF WRITING PENS

[75] Inventor: Ugo Buzzi, Arzo Ti, Switzerland

[73] Assignee: Albe S.A., Agno, Switzerland

[21] Appl. No.: 966,560

[22] Filed: Dec. 5, 1978

[30] Foreign Application Priority Data

Dec. 28, 1977 [CH] Switzerland .................. 16098/77

[51] Int. Cl.³ ............................................. B65G 47/24
[52] U.S. Cl. .................................. 198/399; 198/403; 198/951
[58] Field of Search ............... 198/399, 403, 404, 951

[56] References Cited

U.S. PATENT DOCUMENTS

| 1,890,707 | 12/1932 | Voigt | 198/399 |
| 3,204,751 | 9/1965 | Durr | 198/398 |

FOREIGN PATENT DOCUMENTS 568907 11/1975 Switzerland .................. 198/399

Primary Examiner—Joseph E. Valenza
Attorney, Agent, or Firm—Young & Thompson

[57] ABSTRACT

There is provided an apparatus for orientating elongated articles, in particular bodies of writing pens. These articles are placed in parallel disposition on a conveyor which is moved in step by step fashion. The articles will either be pointing in the desired direction or in the opposite direction to the desired direction. The first pushers are arranged to push the articles not in the desired direction off the conveyor and into an inverting mechanism, and a second pusher pushes the inverted articles from the inverting mechanism back onto the conveyor in the correct disposition. The first pushers distinguish between the articles which are positioned correctly and those which are not in that the configuration of the respective ends of the articles are different, and the first pushers are adapted to engage only one end of each article.

5 Claims, 3 Drawing Figures

APPARATUS FOR ORIENTATING ELONGATED ARTICLES, SUCH AS BODIES OF WRITING PENS

This invention relates to an apparatus for similarly orientated elongated, similar rod-like members of which the respective ends are of different configuration. In a particular adaptation of the invention, the apparatus is adapted to similarly orientate bodies of writing pens.

The mass production of, for example ball-point pens, it is necessary that the ball-point pen bodies be presented in the same disposition, so that other automatic working operations can take place on such bodies. It is necessary therefore that the handling apparatus should include an apparatus for correctly orientating the bodies. It is reasonably easy to arrange ball-point bodies in parallel disposition on a hopper and on a transporting conveyor, but steps must be taken to check that all of the bodies are pointing in the same direction. It will be appreciated that a ball-point pen body traditionally has ends of different configuration in that one end is usually pointed and is provided with a small diameter hole for receiving the point of the pen refill, whilst the other end usually is provided with a large diameter bore for receiving a cap to close the end of the body. Although the ball-point pen bodies can therefore be arranged in parallel in a hopper any one body may lie in either of two directions, and the bodies must be arranged in the same orientation before being presented to a further working apparatus. This is particularly important where the bodies are to be machined and for ensuring effective and reliable automatic machining and assembly.

There are of course known apparatus for the orientating of pen bodies, and in one such apparatus there is provided a sensing means which senses the position of each pen body carried by a step-by-step conveyor, and depending upon what is sensed by the sensing arrangement, individual pen bodies are turned through 180° so that all bodies will be arranged in the same orientation. Such arrangement is adapted to re-orientate only one pen body at a time.

The apparatus of the present invention is arranged to operate on a different principle, and is of a construction at least in its preferred form, which is adapted so that the apparatus can re-orientate more than one rod-like article at the same time, and preferably in the time interval between steps of a stepping conveyor which is adapted to support the rod-like articles.

In accordance with the present invention there is provided, in its broadest aspect, apparatus for similarly orientating elongated similar, rod-like articles of which the respective ends are of different configuration, comprising a step-by-step conveyor which holds the articles individually in parallel disposition, first pusher means adapted to push only those rod-like articles which are displaced by 180° relative to the required position into a rotary inverting mechanism which inverts the articles pushed there into by 180°, and second pusher means for pushing rod-like articles which have been pushed into the inverting mechanism and have been inverted thereby back onto the conveyor in the correct disposition, the first pusher means being able to differentiate between articles which are in the required disposition on the conveyor and those which have to be inverted by virtue of being matched to the end configurations of the rod-like articles.

An embodiment of the present invention will now be described, by way of example, with reference to the accompanying drawing, which shows only the parts necessary for explaining the operation of the apparatus.

Figure 1:
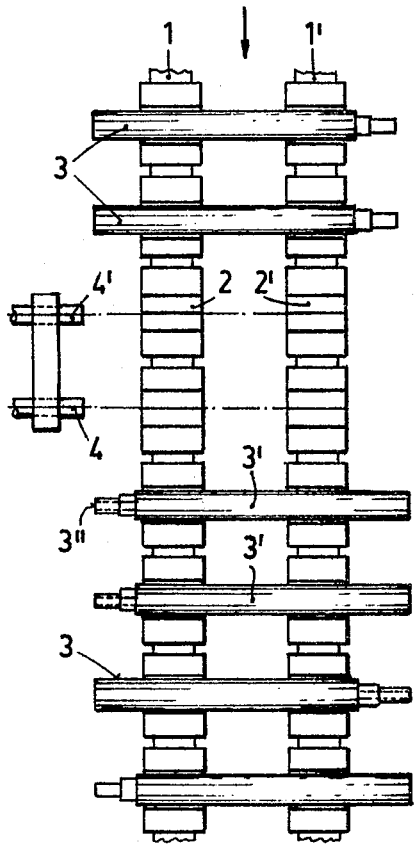
FIG. 1 is a plan view of a conveyor of the apparatus according to the invention.
Figure 2:
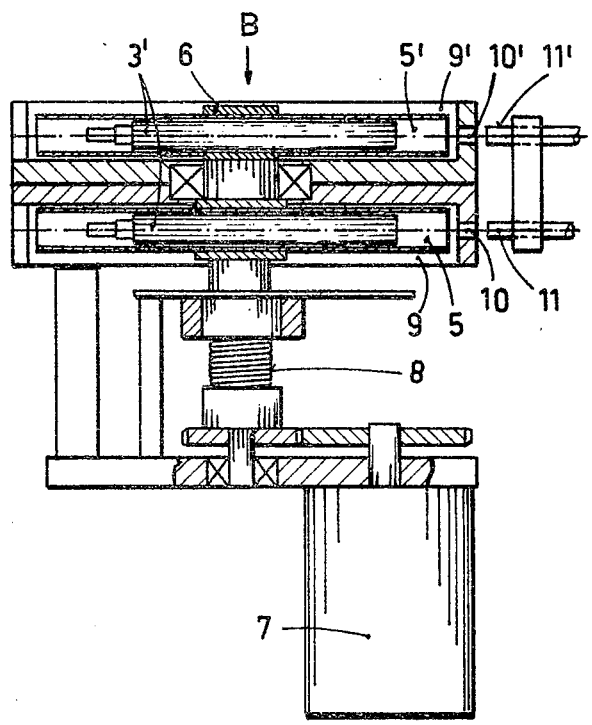
FIG. 2 is a plan view, partly in section, of the inverting mechanism of the apparatus according to the invention.

Referring to FIGS. 1 and 2, the conveyor of FIG. 1 and the inverting mechanism of FIG. 2 are shown in the relative positions which they occupy in the apparatus. The conveyor is indicated by reference A and is adapted to move in a step-by-step fashion. The conveyor comprises a pair of parallel spaced chains 1, 1', provided with support seatings 2, 2'. The seatings 2, 2' are aligned in pairs as shown, and each has a V-shaped notch so that each pair will effectively support a pen body 3 or 3' as shown in FIG. 1, so that the pen bodies carried by the conveyor A will be arranged in parallel disposition. In FIG. 1, the bodies which are arranged in the required orientation or disposition are indicated by reference 3, whilst those bodies which point in a direction opposite to the required direction are indicated by reference 3'.

Figure 3:
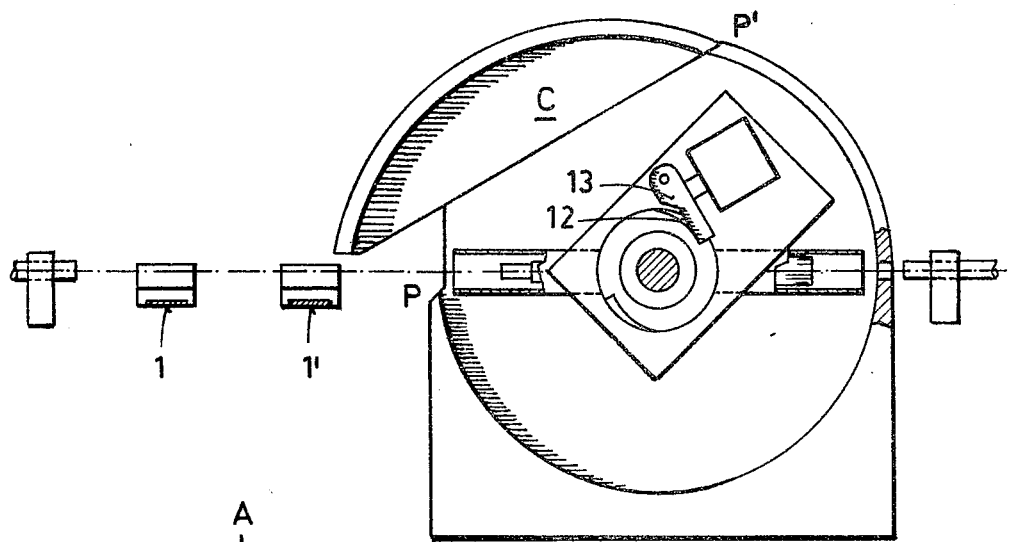
FIG. 3 is a side elevational view, partly in section, of the conveyor of FIG. 1 and inverting mechanism of FIG. 2.

The apparatus includes a pair of push-rods 4, 4' which are spaced and parallel, the spacing between the rods 4 and 4', being equal to the pitch of the supports 2 and 2' on the chains 1 and 1' so that the rods 4 and 4' will become aligned with bodies 3 or 3' carried by the chains 1 and 1'. The rods 4, 4' are also aligned with a pair of tubular supports 5, 5' of the inverting mechanism which is indicated generally by the reference B, so that with axial pushing movement of the rods 4 and 4', wrongly positioned bodies 3' can be pushed from the chains 1, 1' and into the tubular housings 5, 5' as shown in FIG. 2. The housings 5, 5' are adapted to be rotated by a motor 7 which is drivingly connected to a shaft 6 through a spring coupling 8. The housings 5, 5' are rotatable in cavities 9, 9' defined by arcuate walls of extent P, P' as shown in FIG. 3 of approximately 270°, the remaining part of each cavity 9 9', being defined by a positionally adjustable guide segment C. Through the wall defining cavities 9 and 9' is arranged a bore 10 and 10', such bores being aligned with the housings 5 and 5' and the rods 4 and 4' when the apparatus is in the position shown in the drawings. A pair of push rods 11 and 11' are adapted to be moved through the bores 10 and 10' respectively and into the housings 5, 5' in order to displace bodies 3' from the housings 5, 5' and back onto the conveyor A in the required orientation. It will be appreciated therefore that the push rods 11, 11' are aligned with rods 4 and 4'.

The housings 5 and 5' are detachably mounted on the shaft 6 and are connected thereto through a ratchet and pawl arrangement 12,13, comprising a ratchet wheel 12 and a pawl 13. Movement of the pawl 13 is controlled in synchronism with the operation of the apparatus.

Each of the bodies 3 and 3' is of the configuration shown. That is to say, it has a reduced diameter or pointed end in which there is a relatively small bore 3'', whilst at the other end there is a relatively large bore. Use is made of this difference in configuration for the displacement of the bodies 3' from the conveyor A. Thus, when a body is aligned with the pushrod 4 or 4' and is pointing in a direction opposite to the required orientation, its smaller end will be engaged by the rod 4 or 4' and it will be pushed by the rod 4 or 4' into the associated housing 5 or 5'. When in such housing, the body is rotated by the motor 7, and then the rod 11 or 11' pushes the body back onto the conveyor A, but this time in the correct orientation. If the body is already in the correct orientation upon arrival at pushrod 4 or 4', the pushrod will simply enter the body and will not displace same from the conveyor into the inverting mechanism B.

The apparatus is simple and effective. The movement of the pushrods 4, 4' and 11, 11' as well as the rotation of the housings 5, 5' can be synchronised with the movement of the conveyor A, so that these operations take place during a dwell period of the conveyor A. Furthermore, the apparatus can be provided with only one pushrod 4 or 4' and only one housing and pushrod arrangement 5 and 11 or 5' and 11', or it can be provided with a greater number of push rods and housings than 2, as desired. For this purpose, the shaft 6 is preferably replaceable by a longer shaft able to accommodate more housings, and the pushers are arranged so as to be capable of being adapted to suit an inverting mechanism with a larger number of housings.

It will be appreciated that the push rods 4 and 4' are therefore adapted to the end configurations of the bodies to be inverted. It is not necessary that the pushrods should be so adapted in relation to bodies with inner and outer bores at the respective ends, but the invention can readily be applied in cases where the end configurations are different but do not involve large and small bores.

The displacement of the push rods can be controlled by any suitable means such as by cams, and it is preferred that such means will be readily adjustable or inter-changeable in order to achieve variation in length of stroke, and duration of stroke to suit the various shapes and lengths of the various bodies to be orientated.

I claim:

1. Apparatus for similarly orienting elongated similar rod-like articles whose ends are of different configuration from each other, comprising a step-by-step conveyor which holds the articles individually in parallel relationship, inverting mechanism adapted to receive articles moving in a direction parallel to their length off the conveyor, means for rotating the inverting mechanism 180° about an axis perpendicular to the length of the articles, to turn the articles end for end, first pusher means adapted to push articles lengthwise off the conveyor into said inverting mechanism, said first pusher means being so shaped as to contact the ends of only those articles which are incorrectly oriented and to miss the ends of the articles which are correctly oriented thereby to leave on the conveyor those articles which are correctly oriented, and second pusher means adapted to return the inverted articles from said inverting mechanism to said conveyor.

2. Apparatus as claimed in claim 1, in which said articles are pen bodies having an end of small internal diameter and an end of large internal diameter, said pusher means being so shaped as to contact said ends of small diameter but passing freely within said ends of large diameter.

3. Apparatus as claimed in claim 1, said inverting mechanism having a plurality of housings to receive and invert simultaneously a plurality of said articles, said first pusher means being adapted simultaneously to move plural said articles into said housings and said second pusher means being adapted simultaneously to move plural said articles out of said housings.

4. Apparatus as claimed in claim 1, said inverting mechanism comprising at least one hollow tube open at both ends, and an arcuate wall that closes the lower end of the tube during rotation of the inverter means but exposes both ends of said tube when said tube is in alignment with a said article on said conveyor.

5. Apparatus as claimed in claim 1, said axis being horizontal and parallel to said conveyor.

* * * * *